(No Model.)

B. F. PENNY.
MACHINE FOR CUTTING MEAT.

No. 321,751. Patented July 7, 1885.

Attest.
E. N. Adams
Paris Clark

Inventor
Benj. F. Penny,
per R. F. Osgood,
atty.

UNITED STATES PATENT OFFICE.

BENJAMIN F. PENNY, OF ROCHESTER, NEW YORK.

MACHINE FOR CUTTING MEAT.

SPECIFICATION forming part of Letters Patent No. 321,751, dated July 7, 1885.

Application filed January 10, 1885. (No model.)

*To all whom it may concern:*

Be it known that I, BENJAMIN F. PENNY, of the city of Rochester, in the county of Monroe and State of New York, have invented a certain new and useful Improvement in Machines for Cutting Meat; and I do hereby declare that the following is a full, clear, and exact description of the same, reference being had to the accompanying drawings, in which—

Figure 1:
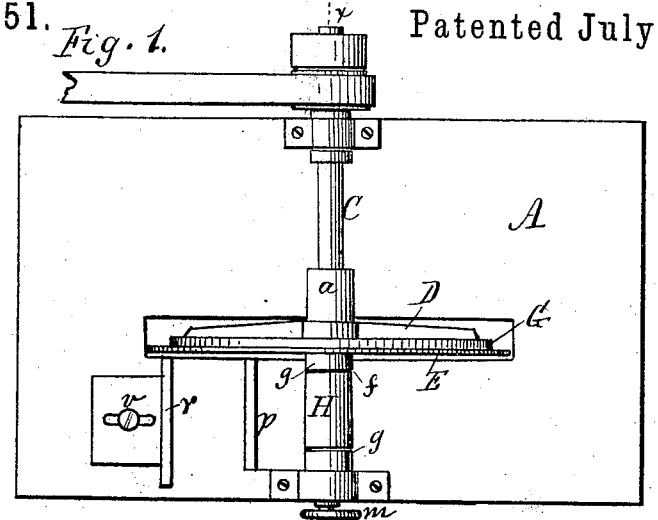
Figure 2:
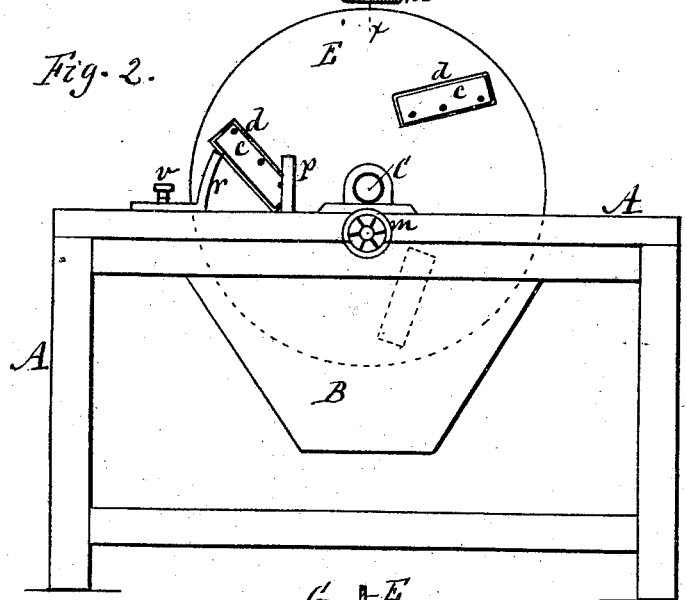
Figure 3:
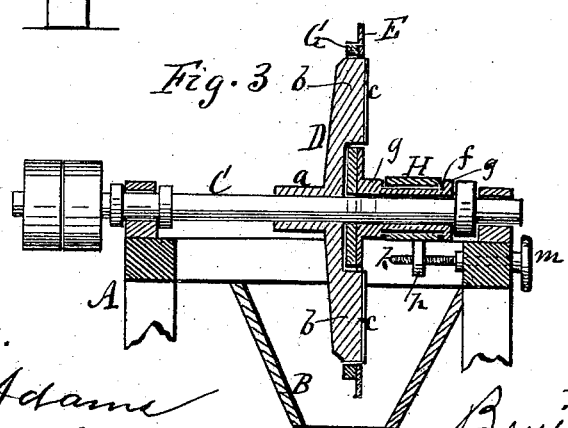
Figure 4:
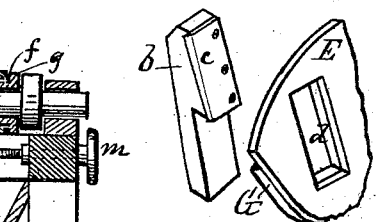

Figure 1 is a plan of a machine showing my improvement. Fig. 2 is a side elevation of the same. Fig. 3 is a section in line $xx$ of Fig. 1. Fig. 4 is a perspective view of the cutting devices detached.

My improvement relates to machines for cutting meat, and is intended more particularly for cutting dried beef into thin shavings. In machines of this class it is customary to use a circular face-plate, against which the meat is pressed, while revolving cutters by a rapid motion cut it away in thin shavings. It is necessary to adjust either the cutters or the face-plate laterally in order to vary the thickness of cut, as well as to adapt the action to different conditions of the meat, hard or soft, and heretofore, so far as I am aware, the face-plate has been non-adjustable, while the cutters have been adjustable out and in. This is objectionable on some accounts, one of which is that when the cutters are made so adjustable it is difficult to attach them so permanently as not to tremble and shake under motion, thus rendering the cutting of the thin shavings very inaccurate and irregular, and interfering with the proper running of the machine.

In my machine the cutters are made non-adjustable and revolve in a fixed plane, while the face-plate is made adjustable; and my invention consists in the special combination and arrangement of parts whereby they are made effective, as hereinafter more fully described.

In the drawings, A shows the frame, which may be of any desired construction, and provided with a hopper, B, for catching the cut meat. C is a horizontal shaft on which the operating parts are mounted, and this shaft is driven by a band or gearing in any suitable manner. D is a disk or cutter-head, provided with offset-lugs $b\ b$, and having a collar, $a$, which is fixed permanently to the shaft and revolves with it. A central hub with as many arms as there are cutters is sufficient for the purpose, and any desired number of cutters may be employed. $b\ b$ are lugs on the ends of the arms which are offset or stand outward beyond the plane of the arms, and have permanently fixed on their outer faces the cutters $c\ c$. These cutters are set at such an angle, as shown in Fig. 2, as to produce a shearing-cut when they strike the material to be cut.

E is the circular face plate, consisting of a disk of thin metal, and G is a thicker disk of smaller diameter secured to its back. Holes $d\ d$ are made through the disk and face-plate, of just such size as will allow the offset-lugs $b\ b$ to pass freely through and leave the cutters projecting on the outside of the face-plate. The face-plate and disk are attached permanently to a hollow spool, $f$, with shoulders $g\ g$ at its ends, which spool fits loosely on the shaft C, and is capable of being slid forward and back on the shaft, carrying the face-plate and disk with it, and thereby adjusting the thickness of cut by uncovering more or less of the cutters. H is a collar fitted loosely on the spool, between its shoulders, and allowing the spool to turn within it. $h$ is an arm projecting down from the collar, and $k$ is a screw turning in a suitable bearing of the frame, its inner end passing through the arm, as shown in Fig. 3. On the outer end of the screw is a hand-wheel, $m$, by which it is turned. It will be seen that as the screw is turned the collar will be adjusted out or in, carrying with it the spool and face-plate, and consequently adjusting the face-plate to cut a thicker or thinner shaving, as before described.

$p$ is a vertical fixed plate, and $r$ is a gage, movable toward and from the plate by means of a set-screw, $v$, which passes through a slot of the base of the gage. The meat is placed between the gage and plate and fed up to the cutters, and as fast as cut it falls down through an opening into the hopper or spout B.

By the means above described the face-plate is adjustable forward and back over the cutters, and the cutters are non-adjustable, always revolving in the same vertical plane, thereby rendering the machine more solid and stable than where the cutters are adjustable, and producing greater uniformity and regularity in the thickness of the shaving, which it is desired to grade as evenly as possible to produce a good article.

In the cutting of dried meats in thin shavings much difficulty has been experienced owing to the softness of the material to be cut, and where the cutters are adjusted out and in it is difficult to make them operate properly.

Having described my invention, what I claim as new, and desire to secure by Letters Patent, is—

In a machine for cutting meat, the combination of the shaft C, driven by band or gear, the disk D, permanently fastened to the shaft, provided with offset-lugs $b\ b$, having the cutters attached thereto, the face-plate E, and its disk G, moving freely on the shaft and having holes $d\ d$, which pass over the lugs, the spool $f$, attached to the face-plate, the collar H, fitted loosely on the spool and resting between the shoulders of the same, the arm $h$, projecting from the collar, and the screw $k$, connected with the arm, the whole arranged to operate in the manner and for the purpose specified.

In witness whereof I have hereunto signed my name in the presence of two subscribing witnesses.

B. F. PENNY.

Witnesses:
R. F. OSGOOD,
P. A. COSTICH.